United States Patent
Jayawardena et al.

(10) Patent No.: US 7,953,855 B2
(45) Date of Patent: *May 31, 2011

(54) DISTRIBUTED DENIAL-OF-SERVICE ATTACK MITIGATION BY SELECTIVE BLACK-HOLING IN IP NETWORKS

(75) Inventors: Thusitha Jayawardena, Holmdell, NJ (US); Luis E. Morales, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 175 days.

This patent is subject to a terminal disclaimer.

(21) Appl. No.: 12/284,254

(22) Filed: Sep. 19, 2008

(65) Prior Publication Data

US 2009/0031040 A1    Jan. 29, 2009

Related U.S. Application Data

(63) Continuation of application No. 10/782,508, filed on Feb. 18, 2004, now Pat. No. 7,444,417.

(51) Int. Cl.
G06F 15/16 (2006.01)
G06F 15/173 (2006.01)
G06F 15/177 (2006.01)

(52) U.S. Cl. ........ 709/225; 709/229; 709/249; 713/153; 719/311; 370/401

(58) Field of Classification Search .......... 709/217–229, 709/249; 713/153; 370/401; 719/311
See application file for complete search history.

(56) References Cited

U.S. PATENT DOCUMENTS 7,444,417 B2 * 10/2008 Jayawardena et al. ........ 709/229
2003/0172145 A1 * 9/2003 Nguyen ........................ 709/223
2004/0250124 A1 * 12/2004 Chesla et al. ................. 713/201

* cited by examiner

*Primary Examiner* — Haresh N Patel

(57) ABSTRACT

In an IP network during a DDoS attack on a website or other internet entity having an IP address, selective black-holing of attack traffic is performed such that some of the traffic destined for the IP address under attack continues to go to the IP address under attack while other traffic, destined for the same IP address is, rerouted via BGP sessions to a black-hole router. Such a selective black-holing scheme can be used to allow some traffic to continue in route to the IP address under attack, while other traffic is diverted.

9 Claims, 2 Drawing Sheets

DISTRIBUTED DENIAL-OF-SERVICE ATTACK MITIGATION BY SELECTIVE BLACK-HOLING IN IP NETWORKS

CROSS-REFERENCE TO RELATED APPLICATIONS

This application is a continuation of U.S. patent application Ser. No. 10/782,508, now U.S. Pat. No. 7,444,417, filed Feb. 18, 2004, which is incorporated herein by reference.

BACKGROUND OF THE INVENTION

1. Field of the Invention

The present invention relates generally to Internet Protocol (IP) networks, and more particularly to redirecting or rerouting attack traffic in response to a Distributed Denial of Service (DDOS) attack caused by an attacker flooding a victim's host system with one or more of several types of attack traffic.

2. Background of the Invention

In a Distributed Denial of Service (DDoS) attack, an attacker takes control of one or more hosts (daemons) and uses the daemons to send an enormous amount of attack traffic to, for example, a web site so that no other traffic can get through to the website. In essence, the website is clogged or jammed with attack traffic. The frequency of DDoS attacks in the Internet has grown in the past several years. The type of attack traffic used by an attacking host (master) is usually TCP SYN or PING type messages. The flooding of a victim's host system with attack traffic causes legitimate users of the victim's host system to be denied access to applications running on the System Under Attack (SUA). The application can be a web server, a file server, a Domain Name System (DNS) server, or other Internet related service or device. The legitimate users cannot access the application due to Central Processing Unit (CPU) and/or bandwidth exhaustion on the system under attack. An attack may have a distributed nature due to the attack traffic being from random, usually spoofed, source IP addresses and originating from many daemon hosts. Also, the attack traffic may enter the victim's Internet Service Provider (ISP) network from various entry points.

It is well known that DDoS attacks are among the most difficult types of attacks to defend against. A system is vulnerable to a DDoS attack simply by being connected to the Internet. The federal government is increasingly aware of DDoS attacks and may propose that federal agencies only utilize ISPs that have DDoS protection in their networks.

BRIEF SUMMARY OF THE INVENTION

A more complete appreciation of the present invention and the scope thereof can be obtained from the accompanying drawings, which are briefly summarized below, the following detailed description of the presently-preferred embodiments of the invention, and the appended claims.

An exemplary embodiment of the present invention provides an ISP the ability to selectively black-hole specific traffic, rather than all traffic, that is addressed to a particular IP address. In particular, traffic destined to the SUA and routed through specific routers within an ISP network can be black-holed while traffic destined to the SUA and routed through other routers in the ISP network may continue toward its original address.

An embodiment of the invention provides an ISP more alternatives than to only be able to black-hole all traffic addressed to an application-under-DDoS attack. Instead, traffic destined to the SUA entering the ISP network through selected routers may be able to continue to the application-under-DDoS attack, while similar traffic entering the ISP network through other selected routers are black-holed. Furthermore, such a selection of ISP entry point routers can be changed in real time so that the origin of or other information about the DDoS attack can be more easily determined.

BRIEF DESCRIPTION OF THE DRAWINGS

The foregoing and other advantages of the invention will become more apparent upon reading the following Detailed Description of Embodiments of the Invention in conjunction and reference with the drawings.

Figure 1:
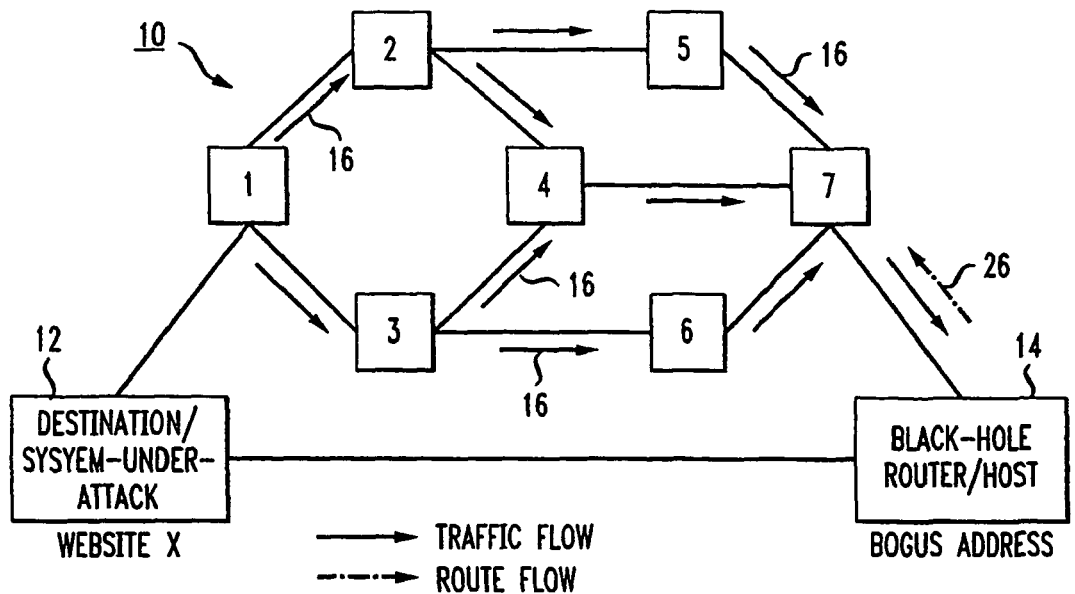
FIG. 1 depicts a general ISP network using a known total black-holing technique.

While the invention is susceptible to various modifications and alternative forms, (for example, the invention can be easily adapted to a case with multiple black-hole routers), specific embodiments have been shown by way of example in the drawings and will be described in detail herein. It should be understood, however, that the invention is not intended to be limited to the particular forms disclosed. Rather, the invention is to cover all reasonable modifications, equivalents, and alternatives falling within the spirit and scope of the invention as defined by the appended claims.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be constructed as limited to the embodiments set forth herein; rather, these embodiments are provided so that this disclosure will be thorough and complete, and will fully convey the scope of the invention to those skilled in the art.

Referring to FIG. 1, a general ISP network 10 is shown comprising routers 1 through 7. Routers 1 through 7 can be substantially any ISP network. Destination 12 has an internet protocol address. Destination 12 may be a website, a server, a router, and an internet subsystem such as a printer, modem bank, memory storage network, etc. In the present exemplary embodiment destination 12 is a website called website X.

For the moment, ignore the arrows and the black-hole host/router 14. Also, note that customer's connection to routers 1 through 7 are not shown, though in an ISP system such customer connections would exist. Such connections are not specifically shown in the figures to clarify the more important aspects of the invention.

If a person or customer is connected to router 5 and the customer requests to be in communication with website X, then the customer's traffic is routed from router 5 to router 1 in at least one of various different routes. When the customer's traffic is routed to router 1, the customer can become in communication with website X 12. Website X has a specific address to which the customer's traffic is directed. The customer's traffic can be routed substantially in any direction through the routers 2, 3, 4, 6 and 7 so long as it ends up at website X 12. The routers through which the customer's traffic travels between router 5 and router 1 are called intermediate routers.

Assume now that an attacker is attacking website X 12. The customer who owns website X notices that his website is bogged down due to incoming attack messages. The customer contacts his or her ISP and informs the ISP that the customer website is under attack.

Referring to FIG. 1, one of the techniques for thwarting an attack is for the ISP to introduce a bogus route for traffic to take to the website. A black-hole router 14 is introduced to the ISP's network. The black-hole router 14 advertises the bogus address to the website under attack. The bogus address and the website under attack each have the same addresses except the bogus address has a higher priority or preference. The higher priority requires that all traffic going to the website-under-attack's address will be diverted or black-holed to the black-hole router 14. The traffic flow arrows 16 indicate the direction of all traffic addressed to the website-under-attack 12 that is redirected to the black-hole router 14 via the bogus address having a higher priority than the website address. The bogus address is the same address as the address for the website-under-attack, the bogus address has a higher priority.

Since all the traffic intended for the website-under-attack is redirected to the black-hole router, then even the valid, non-attacking, traffic is being black-holed. All traffic intended for the website-under-attack is diverted. The attacker has essentially won the attack and shut down the website-under-attack while the ISP and the ISP customer figure out what to do.

The ISP analyzes the redirected traffic being received at the black-hole router 14 in order to trace where the attack traffic is coming from so that a better defense to the attack can be established. Meanwhile, legitimate users of the system are denied access to the website-under-attack because their traffic is also being black-holed.

There are a couple of popular types of attack traffic used by attackers. One type of attack traffic uses SYN attacks. Another type of attack traffic uses ICMP attacks. The SYN attack traffic is used as part of a message sent using Transmission Control Protocol (TCP). In TCP, a packet of information that initiates a TCP connection is called a SYN packet. An attacker sends many, many SYN packets to the website-under-attack. In turn, the website-under-attack, responds by attempting to create a TCP connection to all the incoming SYN packets. The proper response by a website is to reply to each SYN packet with another SYN packet and then wait for the user to send another type of packet called an ACK packet to acknowledge the website's SYN packet and to complete the "TCP Handshake" and establish a TCP connection between the website and the user.

In a SYN attack, the ACK is never sent. Thus, the website-under-attack is bombarded with SYN packets. The website-under-attack replies thereto with SYN packets and waits for an ACK for each reply, but never gets one. The website under attack receives millions of SYN packets, but never receives an ACK. The website-under-attack is trying to set up all the potential TCP connections, but the TCP handshakes are never completed. The website-under-attack's bandwidth is consumed by the incomplete TCP handshakes and is in effect shut down to any valid traffic.

In the other type of attack, a PING attack, the attacker utilizes the "PING" utility of ICMP. The PING utility is used to determine whether a specific IP address is accessible. A PING packet is sent to a specified address and a reply is then sent by the specified address. In a PING attack, millions of PINGs are sent to the website-under-attack and the CPU becomes overwhelmed by attempting to respond to all the PINGs. In effect, the bandwidth of both the website's CPU(s) and communication channels is used up so that valid traffic to the website-under-attack is blocked.

When all traffic to a website-under-attack is diverted by an ISP to a black-hole router 14, it is referred to as non-selective black-holing.

Figure 2:
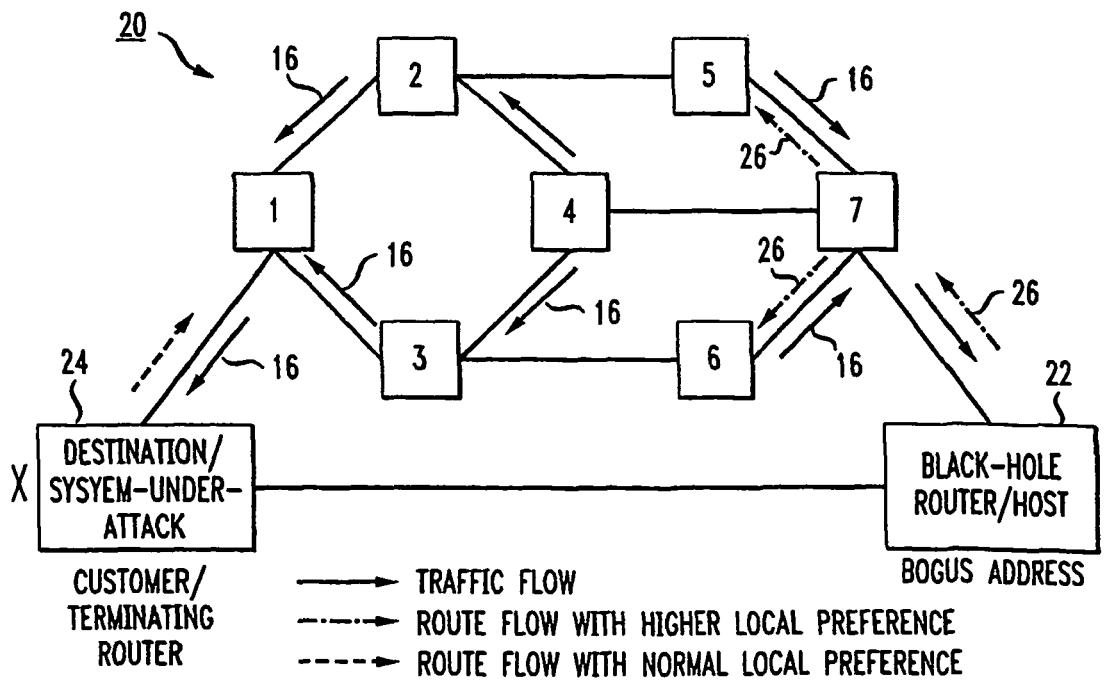
FIG. 2 depicts a general ISP network using a selective black-holing technique in accordance with an embodiment of the present invention.

Referring now to FIG. 2, a system and method for selective black-holing in accordance with an embodiment of the present invention will now be described. An exemplary method of selective black-holing uses Border Gateway Protocol (BGP) as an underlying protocol. It is understood by one of ordinary skill in the art that an exemplary method or system can be applied to other dynamic routing protocols that allow route filtering.

The use of BGP for selective black-hole route propagation allows an ISP to set up a black-holing strategy before an attack on any ISP customers is present. Furthermore, an exemplary method for selective black-hole route propagation provides a means for black-holing traffic destined to the system-under-attack only at predetermined routers by injecting the black-hole route into the BGP with pre-selected community values. Also, an exemplary selective black-holing method allows less than all the routers or hosts in an ISP's system to be used to analyze and determine the attack originating points in the network. In other words, black-holing of attack traffic can be limited to attack traffic traveling through a subset (one or more) of the ISP's routers.

In an ISP network, a basic rule of consistent routing ensures that the BGP next-hop of a destination is the same at every router in the ISP network. When selective black-holing in accordance with an embodiment of the invention is used, this basic rule is broken for the IP address of the system-under-attack (and only for this IP address). Even though this rule requiring the BGP next-hop of a destination to be the same at every router in the ISP network is broken in an exemplary selective black-holing scheme, the routing is set up so that there are no routing loops in the network. That is, routing to the black-hole router 22 and the system-under-attack 24 must be "consistent" in a more general sense as described below.

Breaking the basic rule of consistent routing, discussed above, is not detrimental to the ISP network since it is done during a DDoS attack, and then, only for the IP destination of the system-under-attack 24.

During a DDoS attack, when selective black-holing is used, the BGP next-hop of the destination under attack will either be the black-hole router (or host) 22 or the router 1 which is directly connected to the system-under-attack 24. One of these routers (router 1 or the black-hole router 22) will be the BGP next-hop for the destination at each of the routers in the ISP's network. A couple of examples will help clarify the exemplary selective black-holing method and system.

Referring to FIG. 2, first assume that the network shown 20, like network 10 (in FIG. 1) is an explemplary ISP network, namely, no customers are shown to connect directly to these routers (although they could). There is a full internal BGP (iBGP) mesh among all the routers 1, 2, 3, 4, 5, 6, and 7. Furthermore, like in FIG. 1, assume the system-under-attack is connected to router 1. Assume also that a black-hole router or host 22 is attached to another router 7. An Interior Gateway Protocol (IGP) such as Open Short Path First (OSPF) is running in the network 20. The IP address of the system-under-attack 24 is known by all the routers 1-7 via BGP. A black-hole IP address, which is the same as the system-under-attack's IP address, is injected into the BGP with a higher local preference than the system-under-attack's local preference. So far, this discussion of FIG. 2 has substantially described the system of FIG. 1 that utilizes black-holing.

Still referring to FIG. 2, selective black-holing is what results when a preferred route 26 from the black-hole router 22 is selectively filtered out from the iBGP updates going to a predetermined subset of the routers 1-7. In FIG. 2, selective black-holing is depicted wherein the black-hole route is not propagated to routers 1, 2, 3, and 4. The black-hole route 26 is propagated only to routers 5, 6, and 7. Injecting the black-hole route 26 to only routers 5, 6, and 7 can be achieved dynamically by injecting the black-hole route 26 with a predetermined set of community values, for example, with community values 5, 6, and 7. The set of community values will enable the iBGP sessions, between router 7 and the other routers in the ISP system, to filter out the black-hole route except in routers 5, 6, and 7. Such a scheme will allow all traffic, addressed for the system-under-attack 24, in routers 1, 2, 3, and 4 to continue to flow toward the system-under-attack 24. The scheme will also selectively black-hole all traffic, in routers 5, 6, and 7, addressed for the system-under attack 24 to the black-hole router 22. Such a selective black-holing scheme can be set up in a variety of ways for a variety of predetermined routers. Various selective black-holing schemes can be planned and pre-programmed for activation in anticipation of a DDoS attack's mitigation. By changing the community value of the black-hole route 26, more or less routers will receive the black-hole route 26.

It is important for selective black-holing to keep the routing "consistent" throughout the ISP Network 20. By consistent, it is meant that any router in which the black-hole route is installed should never forward traffic, destined for the black-hole router 22, to a router in which the original route to the system-under-attack is installed and vice versa.

To have "consistent" routing, in a general sense, for an exemplary selective black-holing method and system, the IGP next-hop (i.e., traffic movement to a next router) from each router designated to send traffic, addressed to the system-under-attack, toward the black-holing router must point toward another router that is also designated to send the same IP addressed traffic toward the black-holing router. Furthermore, the IGP next-hop of each router designated to send traffic toward the system-under-attack must point to another router that will send the designated traffic to the system-under-attack.

In other words, the consistency condition of routing for an exemplary embodiment requires that the IGP next-hop at each non-black-holing router point to another non-black-holing router and the IGP next-hop of each black-holing router point to another black-holing router. A black-holing router is a router that installs the black-hole route to router 22 into its routing table and a non-black-holing router is a router that installs the original route to the system-under-attack's IP address into its routing table. Any router that receives both routes will always install the black-hole route into its routing table because the black-hole route has the higher local preference.

In symbolic terms the conditions for consistent routing in an exemplary embodiment is as follows:

Let $R_{bh}$ denote a set of routers in an ISP network wherein a black-hole route is installed in the routing table, i.e., these are the routers where the BGP next-hop of the IP address of the system-under-attack is the router 22. $R_o$ denotes a set of non-black-holing routers (i.e., those routers where the original BGP next-hop, router 1, is installed in the routing table for the system-under-attack). Then, the following three conditions should hold true for consistent routing:

$$R_{bh} \cup R_o =$$

The set of all routers (i.e., every router in the ISP network has at least one of the routes (non-black-holing or black-holing) installed).

$$R_{bh} \cap R_o =$$

Empty set (there is no router in which both black-holing and non-black-holing routes are installed)

Let N(R) denote the set of IGP next-hop routers for the IP address of the system-under-attack in the routing tables of the set of routers R. The third condition for consistent routing for an exemplary ISP network is:

$$N(R_{bh}) \subseteq R_{bh}; N(R_o) \subseteq R_o$$

The IGP next-hop for the system-under-attack at a black-holing router points to another black-holing router and the IGP next-hop for the system-under-attack at a non-black-holing router points to another non black-holing router.

In essence, when a router needs to send traffic to a destination known via BGP, the router looks up the BGP next-hop for the destination. Typically, to reach the BGP next-hop, the router has to send the traffic to some other directly connected intermediate router. This directly connected intermediate router is determined by the IGP next-hop to the BGP next-hop. This is the familiar recursive route look up scheme in IP networks. For example, in FIG. 2, if traffic is at router 4 and is going to router 1, an IGP next-hop router may be router 2. Furthermore, if traffic at router 5 is addressed to the system-under-attack 24, but has been redirected to the black-hole router 22, the traffic's IGP next-hop router will be router 7.

An exemplary selective-black-holing method and system comprises a division of all the routers in an ISP network. The routers are divided into two sets; being black-holing routers and non-black-holing routers. Every such division will not result in consistent routing for the system-under-attack. For a division of routers to result in consistent routing it should satisfy the three conditions described above. The third condition will depend on the IGP that is used in the ISP network.

Figure 3A:
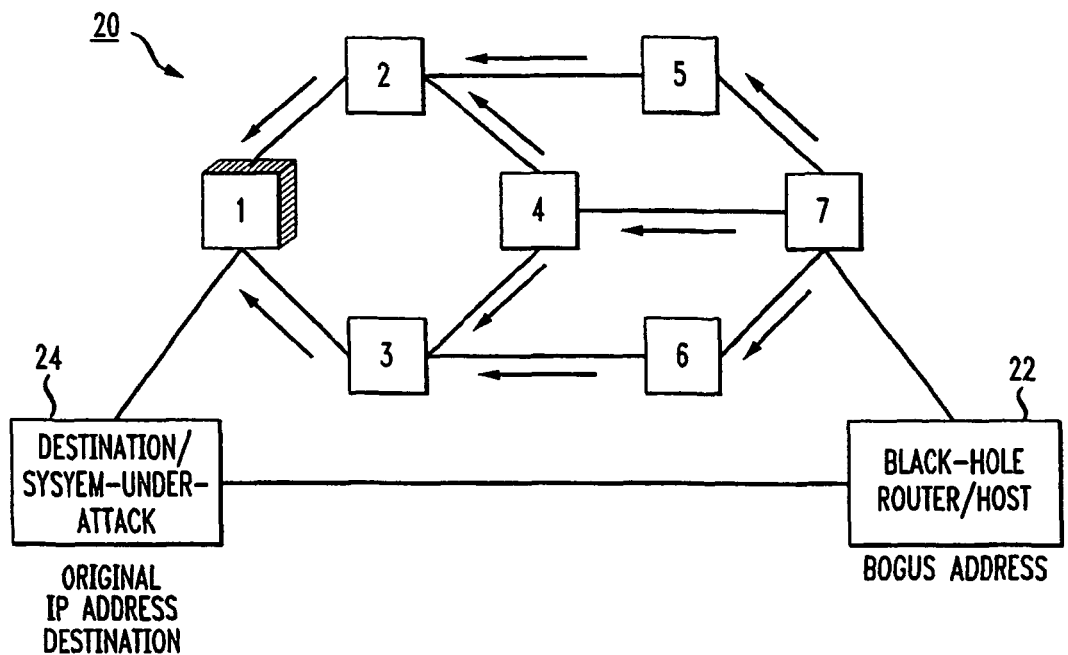
FIGS. 3A and 3B depict exemplary next-hop routers for exemplary next-hop routing toward exemplary routers 1 and 7, respectively.
Figure 3B:
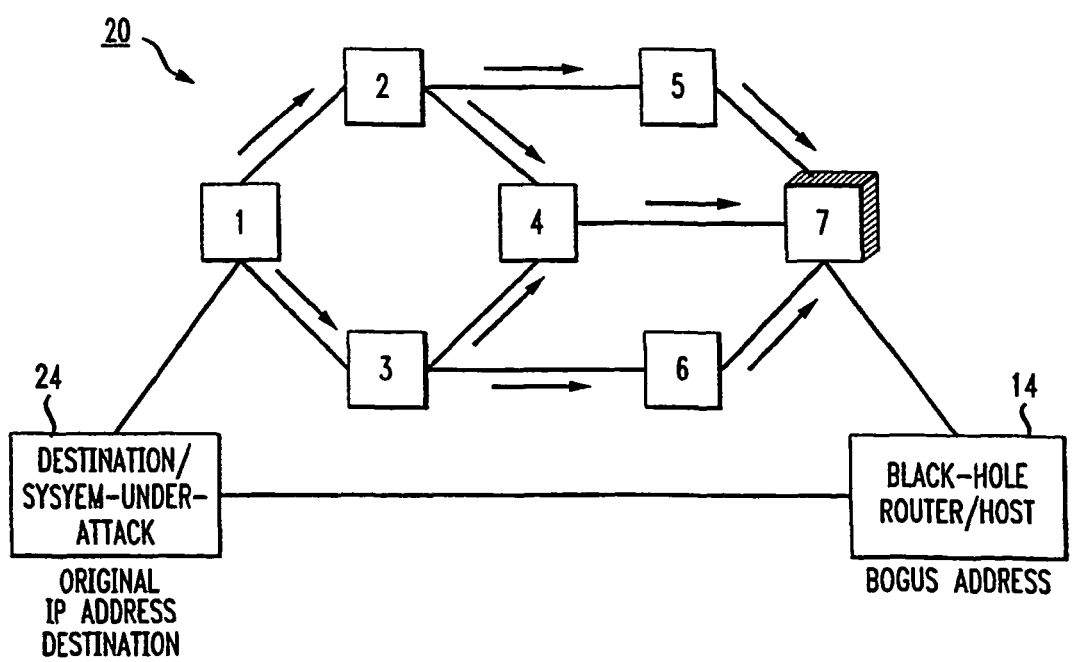

This concept is best illustrated with an example:

Assume in FIGS. 3A and 3B that the IGP is OSPF with a metric set to 1 on each link of the network between each router. Then the OSPF routes to routers 1 and 7 are as shown in Table 1.

TABLE 1

| OSPF Next-Hop to Routers 1 and 7 | | |
|---|---|---|
| AT ROUTER | OSPF NEXT-HOP TO ROUTER 1 | OSPF NEXT-HOP TO ROUTER 7 |
| 1 | Self | 2, 3 |
| 2 | 1 | 4, 5 |
| 3 | 1 | 4, 6 |
| 4 | 2, 3 | 7 |
| 5 | 2 | 7 |
| 6 | 3 | 7 |
| 7 | 4, 5, 6 | Self |

Using Table 1 and FIGS. 3A and 3B various different black-holing strategies can be devised such that routing to the system-under-attack 24 and the black-hole router 22 (having the same address as the system-under-attack, but with a higher preference) is consistent using the OSPF, or other type of IGP, next-hop information. Table 2 provides schemes that are consistent routing in accordance with an embodiment of the invention. Table 2 is not an exhaustive list of consistent black-holing schemes for this example.

TABLE 2

Selective Black-Holing Schemes with Consistent Routing

| SELECTIVE BLACK-HOLING SCHEME NO. | BLACK-HOLE ROUTERS | NON-BLACK-HOLE ROUTERS |
|---|---|---|
| 1 | 7 | 1, 2, 3, 4, 5, 6 |
| 2 | 7, 5 | 1, 2, 3, 4, 6 |
| 3 | 7, 6 | 1, 2, 3, 4, 5 |
| 4 | 7, 6, 5 | 1, 2, 3, 4 |
| 5 | 7, 4 | 1, 2, 3, 5, 6 |
| 6 | 7, 4, 5 | 1, 2, 3, 6 |
| 7 | 7, 6, 5, 4 | 1, 2, 3 |
| 8 | 2, 4, 5, 6, 7 | 1, 3 |
| 9 | 2, 3, 4, 5, 6, 7 | 1 |
| 10 | 1, 2, 3, 4, 5, 6, 7 | — |

The following selective black-holing schemes in Table 3 result in inconsistent routing to the system-under-attack 24 and the black-hole router 22.

TABLE 3

Inconsistent Selective Black-Holing Schemes

| SELECTIVE BLACK-HOLING SCHEME NO. | BLACK-HOLE ROUTERS | NON-BLACK-HOLE ROUTERS |
|---|---|---|
| 1 | 7, 2 | 1, 3, 4, 5, 6 |
| 2 | 7, 3 | 1, 2, 4, 5, 6 |

A selective black-holing scheme can be selected and implemented in real-time during a DDoS attack. The selective black-holing method or system is selected by injecting the IP address of the system-under-attack with a community value that establishes a predetermined division of all ISP routers into black-hole routers and non-black-hole routers. The community-based filtering of routes to the system-under-attack via the community values can be set up for use prior to and implemented during a DDoS attack.

There are various advantages to using selective black-holing in an IP network. For one thing, the response time to a DDoS attack can be decreased using selective black-holing when compared to non-selective-black-holing: Since various selective black-holing strategies are preconfigured, one can be selected and implemented as soon as a DDoS attack is underway using BGP routing and community-based route filtering. When a DDoS attack commences, the selective black-holing scheme can be initiated by announcing the IP address of the system under attack with a selected or pre-defined community value so that each router in the ISP system becomes either a black-holing router or a non-black-holing router.

Embodiments of the invention provide an adjustable and selective black-holing strategy that can be modified in real-time during a DDoS attack in order to black-hole more or less traffic addressed to the system-under-attack. This results in allowing some traffic, that may be valid traffic, to proceed to its original destination being the system-under-attack.

Embodiments of the present invention and obvious variations thereof are contemplated as falling within the spirit and scope of the claimed invention, which is set forth in the following claims.

What is claimed as new and desired to be protected by Letters Patent of the United States is:

1. A method of black-holing internet traffic in an internet service provider network, the method comprising:
    injecting, by a first router, an instruction into the internet service provider network;
    responding to the instruction, by a plurality of routers within the internet service provider network, such that a first number of routers become black-holing routers and a second number of routers become non-black-holing routers;
    routing internet traffic addressed for a first IP address, by the non-black-holing routers, to an internet application having the first IP address; and
    routing internet traffic addressed for the first IP address, by the black-holing routers, to a black-hole router having the first IP address,
    wherein routing internet traffic is consistent routing requiring the black-holing routers to route traffic having the first IP address to other black-holing routers and wherein the non-black-holing routers route the first IP address to other non-black-holing routers.

2. The method of claim 1, wherein the instruction is a dynamic routing protocol instruction.

3. The method of claim 1, wherein the instruction provides a black-holing route injected into a Border Gateway Protocol.

4. The method of clam 1, wherein each black-holing router provides the Internet traffic, routed toward the black-hole router, to a next-hop black-holing router.

5. The method of claim 1, further comprising, changing the number of the first number of routers and the second number of routers in real-time.

6. The method of claim 1, wherein the route to the black-hole router having the first IP address has a preference higher than a preference for the route to the internet application having the first IP address.

7. An internet service provider network comprising:
    a first router in communication with the internet service provider network;
    an internet application, having a first IP address, in communication with the first router, the first router directing internet traffic to the first IP address of the internet application; and
    a second router, configured as a black-hole router, in communication with the internet service provider network, the second router configured to receive internet traffic that was originally addressed to the first IP address, but was re-routed through a number of predetermined routers within the internet service provider network, the number of predetermined routers being less than all the routers in the internet service provider ISP network, wherein the internet traffic addressed to the first IP address, but rerouted through predetermined routers comprises both attack and legitimate traffic.

8. The internet service provider network of claim 7, wherein the attack traffic comprises at least one of PING and SYN messages.

9. The internet service provider network of claim 7, wherein the predetermined routers create consistent routing to the second router.

* * * * *